United States Patent
Oberbrunner

(10) Patent No.: US 11,928,748 B1
(45) Date of Patent: Mar. 12, 2024

(54) METHOD AND APPARATUS FOR SCANNABLE NON-FUNGIBLE TOKEN GENERATION

(71) Applicant: BLOCKCHAIN LIFE, LLC, Powell, OH (US)

(72) Inventor: Kary Oberbrunner, Lewis Center, OH (US)

(73) Assignee: BLOCKCHAIN LIFE, LLC, Powell, OH (US)

( * ) Notice: Subject to any disclaimer, the term of this patent is extended or adjusted under 35 U.S.C. 154(b) by 0 days.

(21) Appl. No.: 17/955,282

(22) Filed: Sep. 28, 2022

(51) Int. Cl.
| | |
|---|---|
| *H04L 9/32* | (2006.01) |
| *G06Q 20/32* | (2012.01) |
| *G06Q 30/0241* | (2023.01) |
| *G06Q 30/06* | (2023.01) |
| *G06Q 50/18* | (2012.01) |
| *G06N 20/00* | (2019.01) |
| *G06Q 30/0283* | (2023.01) |

(52) U.S. Cl.
CPC ....... *G06Q 50/184* (2013.01); *G06Q 20/3276* (2013.01); *G06Q 30/0241* (2013.01); *H04L 9/3213* (2013.01); *G06N 20/00* (2019.01); *G06Q 30/0283* (2013.01); *G06Q 30/06* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,334,875 | B2* | 5/2022 | Yantis | G06Q 20/405 |
| 11,334,883 | B1* | 5/2022 | Auerbach | G06Q 20/223 |
| 11,616,650 | B1* | 3/2023 | Panjwani | H04L 9/3213 |
| | | | | 713/168 |
| 2014/0319209 | A1* | 10/2014 | Beadles | G06Q 30/0207 |
| | | | | 235/494 |
| 2019/0213311 | A1* | 7/2019 | Tussy | G06V 10/17 |
| 2022/0109562 | A1 | 4/2022 | Feola | |
| 2022/0229883 | A1 | 7/2022 | Khandelwal | |
| 2023/0086644 | A1* | 3/2023 | Jakobsson | G06Q 20/367 |
| | | | | 705/65 |
| 2023/0186281 | A1* | 6/2023 | Todasco | G06Q 20/38215 |
| | | | | 705/64 |
| 2023/0245163 | A1* | 8/2023 | Braganza | G06Q 30/06 |
| | | | | 705/14.39 |

\* cited by examiner

*Primary Examiner* — Chrystina E Zelaskiewicz
(74) *Attorney, Agent, or Firm* — Caldwell Intellectual Property Law

(57) ABSTRACT

An apparatus and method for scannable non-fungible token generation, the apparatus including at least a processor and a memory communicatively connected to the processor. The memory containing instructions configuring the processor to receive a creative work datum, determine a creative work class as a function of the creative work datum, generate a creative work token as a function of the creative work datum, and store the creative work token in an immutable sequential listing, where storing the creative work token includes generating a smart contract associated with the creative work datum, the smart contract also including the creative work class. The processor further configured to generate a machine-readable code as a function of the creative work token and the creative work class and transmit the machine-readable code to an output device.

16 Claims, 8 Drawing Sheets

US 11,928,748 B1

METHOD AND APPARATUS FOR SCANNABLE NON-FUNGIBLE TOKEN GENERATION

FIELD OF THE INVENTION

The present invention generally relates to the field of non-fungible tokens. In particular, the present invention is directed to apparatus and method for generation of scannable non-fungible tokens.

BACKGROUND

The current marketplace for non-fungible tokens is cumbersome for newcomers, and it has limitations when it comes to owning physical pieces of art through smart contracts. Furthermore, physical literature, such as books, often lack an easy to access digital companion version. Current solutions to these problems are not sufficient.

SUMMARY OF THE DISCLOSURE

In an aspect, an apparatus for scannable non-fungible token generation, the apparatus including at least a processor and a memory communicatively connected to the processor. The memory containing instructions configuring the processor to receive a creative work datum, determine a creative work class as a function of the creative work datum and generate a creative work token as a function of the creative work datum. The memory containing instructions further configuring the at least a processor to store the creative work token in an immutable sequential listing, where storing the creative work token includes generating a smart contract associated with the creative work datum, the smart contract also including the creative work class. The memory containing instructions further configuring the at least a processor to generate a machine-readable code as a function of the creative work token and the creative work class, and transmit the machine-readable code to an output device.

In another aspect a method for scannable non-fungible token generation, the method including receiving a creative work datum, determining a creative work class as a function of the creative work datum and generating a creative work token as a function of the creative work datum. The method further including storing the creative work token in an immutable sequential listing, where storing the creative work token includes generating a smart contract associated with the creative work datum, the smart contract including the creative work class, generating a machine-readable code as a function of the creative work token and the creative work class, and transmitting the machine-readable code to an output device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and method for scannable non-fungible token generation. In an embodiment, apparatus, through a processor, receives a creative work datum, determine a creative work class for the creative work datum, generate a creative work token associated with the creative work datum, stores the creative work token in an immutable sequential listing, that includes generating a smart contract that includes the creative work class, generate a machine-readable code based on the creative work token and creative work class and transmit the machine-readable code to an output device.

Aspects of the present disclosure may be used to make scannable non-fungible tokens that may be printed and attached to physical objects, such as a painting. Exemplary embodiments illustrating aspects of the present disclosure are described below in the context of several specific examples.

Figure 1:
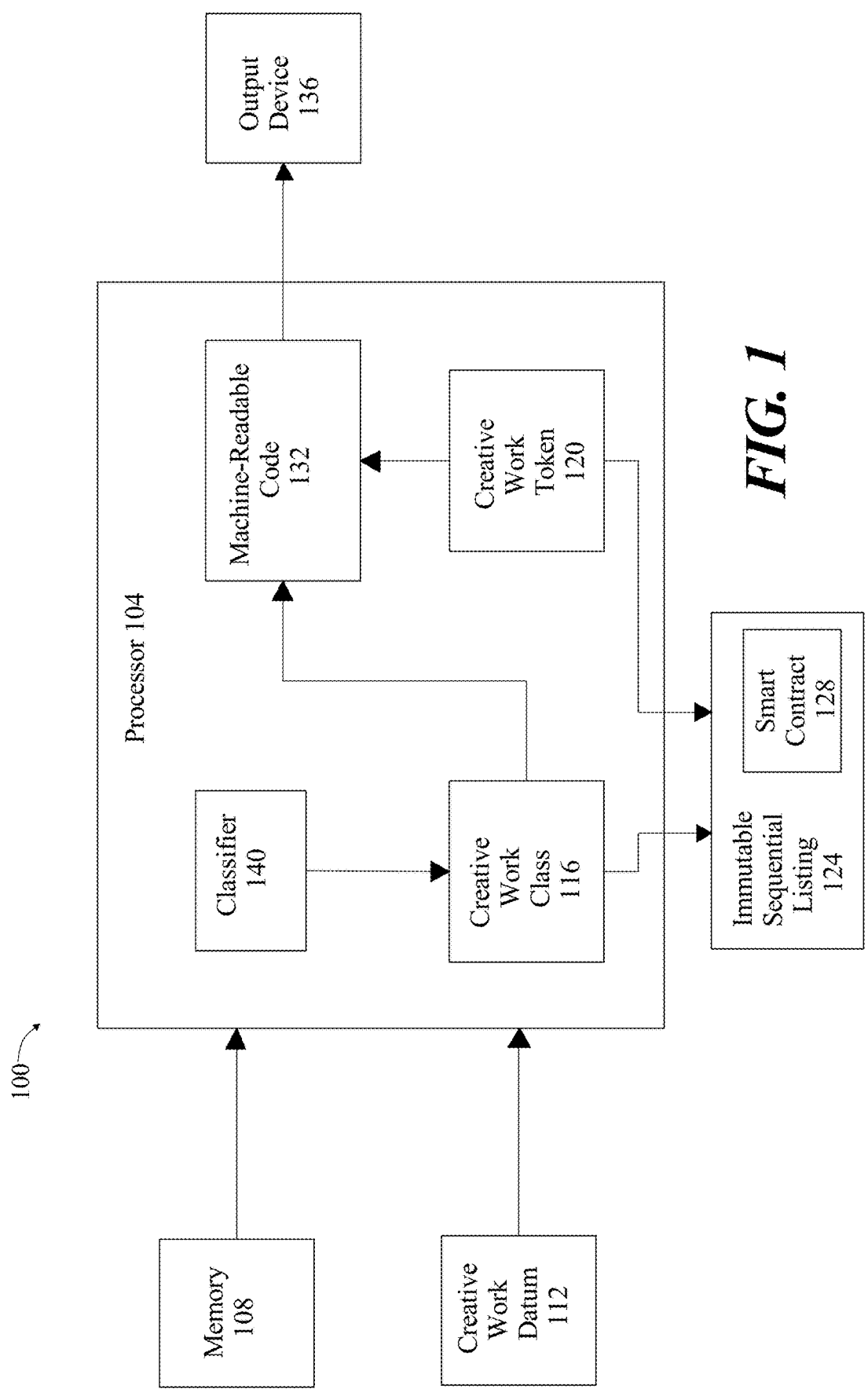
FIG. 1 is an illustrative block diagram of an exemplary embodiment of an apparatus for scannable non-fungible token generation.

Referring now to FIG. 1, an exemplary embodiment of an apparatus 100 for scannable non-fungible token generation is illustrated. A "non-fungible token," as used in this disclosure, is a unique and non-interchangeable unit of data stored on a digital ledger and/or immutable sequential listing. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or processor 104. Immutable sequential listing is discussed in more detail further below.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Continuing to refer to FIG. 1, apparatus 100 includes a memory 108 communicatively connected to the at least a processor 104, wherein the memory 108 contains instructions configuring processor 104 to perform tasks in accordance with this disclosure. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, memory 108 contains instructions configuring processor 104 to receive a creative work datum 112. A "creative work datum," as used herein, refers to data, or an element of data, representing a work piece in machine-encoded format. In an embodiment, creative work datum 112 may include any tangible medium. In embodiments, creative work datum 112 may include any intangible mediums. In a nonlimiting example, creative work datum 112 may be the work piece itself if the work piece is in digital form. In anoth0r non limiting example, creative work datum 112 may include information related to a physical work piece, such as information enabling ownership of a physical painting. In a nonlimiting example, creative work datum 112 may include the contents of a book. In an example, without limitations, creative work datum 112 may include specific contents within a book, such as charts, graphs, logos, and the like. In another nonlimiting example, creative work datum may include a trademark. In an example, without limitations, creative work datum 112 may include a company logo. In some embodiments, creative work datum 112 may be received as a function of converting information associated with a work piece, such as a book's ISBN and art cover, using an optical device. A "work piece," as used herein, refers to, without limitations, any work of art produced by a person or a computer, including physical and digital manifestations of the art. In one nonlimiting example, work piece may include a physical book. In another nonlimiting example, work piece may include a digital image. Converting information associated with the work of art to machine-encoded data is described with reference to FIG. 2 further below.

Continuing to refer to FIG. 1, memory 108 contains instructions configuring processor 104 to determine a creative work class 116 as a function of the creative work datum 112. A "creative work class," as used in this disclosure, is a class associated with the creative work datum 112 that specifies an ownership type of the work piece associated with the creative work datum 112. In an embodiment, creative work class 116 may be set by creative piece's author and/or creator. In an embodiment, creative work class 116 may include rights and privileges related to redistribution, royalty fees owed to author upon distribution, and the like. In a nonlimiting example, creative work datum 112 may include specifications giving the buyer access to exclusive events related to the work piece, which may cause processor 104 to determine that the creative work class 116 is a "collector" class. In another nonlimiting example, creative work class 116 may include an "author" class. For example, without limitations, an "author" creative work class 116 may set a royalty percentage on resale by default. In an example, and without limitations, creative work class 116 may include an "owner" class. For example, without limitations, an "owner" creative work class 116 may give a buyer of the work piece a right to resale without royalties included. In another nonlimiting example, creative work class 116 may include a "creator" class. For example, without limitations, a "creator" creative work class may signify that work piece belongs to the creator of the piece. Additionally, as another nonlimiting example, a "creator" creative work class 116 may require that permission from the creator of the work piece to be resold. In another nonlimiting example, creative work class 116 may include an "investor" class. For example, without limitations, an "investor" creative work class 116 may include both and individual and a commercial entity as owners of the work piece. In another nonlimiting example, creative work class 116 may include a "copyright" class. For example, a "copyright" creative work class 116 may give a buyer not only ownership to the work piece but may also give the buyer rights to the any copyrights related to the work piece. Persons having ordinary skill in the art, after having reviewed the entirety of this disclosure, will recognize that the classes described herein are used for illustrative purposes only. As such, creative work class 116 may include a plurality of classes not included in this disclosure.

Still referring to FIG. 1, in an embodiment, memory 108 may contain instructions configuring processor 104 to determine creative work class 116 associated with creative work datum 112 by querying a database. For example, creative work datum may include an identifier, which is used by processor 104 to query a database for the creative work class 116 associated with the work piece. In embodiments, creative work class 116 may be determined by querying an immutable sequential listing. In some embodiments, creative work datum 112 may include the creative work class 116. In a nonlimiting example, creative work datum 112 may include metadata describing creative work class 116. "Metadata," as used herein, is a data, or an element of data, that describes and gives information about other data, such as creative work class 116.

With continued reference to FIG. 1, memory 108 contains instructions configuring processor 104 to generate a creative work token 120 as a function of the creative work datum 112. A "creative work token," as used in this disclosure, is a non-fungible token (NFT) that is uniquely associated with the creative work datum 112. In an embodiment, creative work token 120 may be generated by creating a NFT associated with the work piece in a NFT block-chain platform, which is a process commonly known as "minting," such as the Ethereum Polygon platform, owned by Polygon Technology, located at #157, 2nd A Cross, Indiranagar Double Rd, Bengaluru, Karnataka, 560071, India.

Continuing to refer to FIG. 1, memory 108 contains instructions configuring processor 104 to store the creative work datum 112 in an immutable sequential listing 124, where storing the creative work token 120 includes generating a smart contract 128 associated with the creative work datum 112. In an embodiment, smart contract 128 includes the creative work class 116. A "smart contract," as used in this disclosure, refers to a program stored in an immutable sequential listing, also referred to as blockchain, that are configured to run when predetermined conditions are met. Smart contract 128 may also include a reference to a location of creative work datum 112, such as reference to location of creative work datum 112 in a database, or immutable sequential listing. In an embodiment, smart contract 128 may be generated by the deployment of programming scripts, such as the Solidity scripting language, owned by Etherum Foundation, headquartered in Zeughausgasse 7A, 6300 Zug, Switzerland. In a nonlimiting example, apparatus is configured to input identifier 208, location in a data structure of digital representation of work piece, or a cover art if smart contract 128 is meant to be associated with a physical work piece, and information associated with the work piece, such as creative work class 116, into an automated script configured to generate smart contract 128. Smart contract 128 may also be generated by using third-patty smart contract generation software, such as Chainlink Labs, owned by Chainlink Foundation, headquartered in Strathvale House 90 North Church Street George Town Grand Cayman KY1-1102 Cayman Islands. Persons having ordinary skill in the art will, after having reviewed the entirety of this disclosure, recognize that descriptions above are used for exemplary purposes only and that disclosure may include any method of deploying scripts configured to generate smart contract 128. Generating smart contract 128 is discussed in more detail in FIG. 2.

Still referring to FIG. 1, memory 108 contains instructions further configuring processor 104 to generate a machine-readable code 132 as a function of the creative work token 120. In an embodiment, machine-readable code 132 may include a quick response (QR) code. In a further embodiment, machine-readable code 132 may include a password protected QR code. In another embodiment, machine-readable code 132 may include a near field communication (NFC) tag. In an embodiment, machine-readable code 132 may include an advertisement datum. An "advertisement datum," as used in this disclosure, refers to an element of data describing a sponsored content, such as a link to an advertiser website. In a nonlimiting example, upon scanning a QR code attached to a book, a user may receive the non-fungible token for the book and a link to other books by the same author or publisher. In another embodiment, advertisement datum may be included based on the creative work class 116 associated with creative work datum 112. In a nonlimiting example, a machine-readable code 132 may include advertisement datum only for creative work datum 112 associated with a "collector" class non-fungible token, where the advertisement datum may include information related to exclusive events associated with the work piece.

Continuing to refer to FIG. 1, memory 108 contains instructions configuring processor 104 to transmit the machine-readable code 132 to an output device 136. As used herein, an "output device" is a device configured to display information to someone or something. Output device may include a wearable smartwatch, a smartphone, a mobile app, and the like. Output device 136 may receive input from user through standard I/O interface such as ISA (Industry Standard Architecture), PCI (Peripheral Component Interconnect) Bus, and the like. Output device 136 may receive input from a user through standard I/O operation. Output device 136 may further use event-driven programming, where event listeners are used to detect input from user and trigger actions based on the input. In an embodiment, output device 136 may include a smart printer configured to receive and print machine-readable code 132. Output device 136 may include any computing device described throughout this disclosure. In a nonlimiting example, output device 136 may be used by an author to scan machine-readable code 132. In another example, without limitations, output device 136 may be used by a content creator to scan machine-readable code 132. In some examples, output device 136 may be used by an NFT art collector to scan machine-readable code 132. In some examples, output device 136 may be used by a Web3 content creator to scan machine-readable code 132.

With continued reference to FIG. 1, processor 104 may be further configured to monitor the number of times machine-readable code 132 has been scanned. In an embodiment, processor 104 may be further configured to re-classify the creative work class 116 associated with the creative work datum 112 based on the number of scans. In a nonlimiting example, based on the number of scans performed of a work piece of limited availability, creative work class 116 of the work may be reclassified from an "owner" class to an "author" class, which would increase the value of the work piece and add a royalty fee upon resale. In an embodiment, number of scans may be a preset number. In further embodiments, creative work datum 112 may include a preset scan threshold. In some embodiments, processor 104 may be configured to reclassify creative work class 116 as a function of the preset scan threshold. In a nonlimiting example, processor 104 tracks the number of times a QR code for a work piece has been scanned, and once the number of scans reach or surpass a preset scan threshold, processor 104 may modify creative work class 116 to a class that is more profitable to the author/creator, such as changing it to a class that includes royalties on resale.

Still referring to FIG. 1, in an embodiment, processor 104 may be configured to re-classify the creative work class 116 as a function of a classifier 140. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. Classifier 140 may be configured to output at least a datum that labels or otherwise identifies a set of data that are clustered together, found to be close under a distance metric as described below, or the like. Processor 104 and/or another device may generate a classifier using a classification algorithm, defined as processes whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. In a nonlimiting example, classifier 140 may receive a number of scans of machine-readable code 132 for creative work datum 112 as input and output the creative work class 116 associated with the number of scans. For example, and without limitations, classifier 140 may be used to re-classify a creative work class 116, set as "owner" class, to a "collector" class after the number of scans of machine-readable code 132 exceed a set threshold set for creative work datum 112 associated with machine-readable code 132. In an embodiment, each creative work class 116 of a work piece may have a different scan number threshold. In a nonlimiting example, a work piece may have a threshold of 20 scans to trigger a re-classification from "owner" to "collector" but may have a threshold of 200 scans to trigger a reclassification from "collector" to "author." In another nonlimiting example, work piece may have a threshold of 50 scans to trigger a re-classification from "collector" to "author" as the higher number of scans may signify that the work piece is becoming popular, and the incentives associated with the "collector" class may no longer be needed. In some embodiments, preset scan threshold may be set as a function of classifier 140. In a nonlimiting example, processor 104 using classifier 140 may compare identifying work piece data in creative work datum 112 to similar work pieces, such as by querying a database, and set the preset scan threshold to the same number of scans as the similar work pieces. Classifier is discussed in more detail in FIG. 4.

With continued reference to FIG. 1, in some embodiments, scan threshold may be associated with a specified measurement of time. For example, without limitations, work piece may have an associated threshold of 150 scans within 60 days of transmitting machine-readable code 132 to output device 136. In this nonlimiting example, failure to reach the 150 scans in 60 days may trigger reclassification of work piece from "author" to "owner" as the lack of scan may signify that the royalty associated with the work is reducing the likeability of a sale.

Continuing to refer to FIG. 1, in an embodiment, classifier 140 may be trained using training data. Training data may include creative work data and number of scans associated with creative work classes. In an embodiment, training data may include previous outputs of classifier 140. In other embodiments, training data may be generated by user input, such as a user manually assigning labels in a database that includes associations of creative work classes to creative work data and scan number thresholds. In an embodiment, smart contract 128 may include a scan number threshold associated with the work piece. In an embodiment, training data may include entries in immutable sequential listing 124. In an embodiment, training data may be crowdsourced from a plurality of users. In an example, without limitations, user may rate their likeability to buy a work piece, which may be translated on a database into a scan number threshold for each work piece associated with creative work class 116. In a further example, without limitations, users may rate likeability of buying a work piece at each creative work class 116, such as the likeability to buy if classification changed from owner to collector, or from collector to author. In this example, the number of "likes" that a work piece gets at each creative work class 116 may be translated to the scan number threshold which would trigger a re-classification of creative work class 116. In another nonlimiting example, training data includes test data inputted by an user in a test database. Training data is discussed in further detail in FIG. 4.

Still referring to FIG. 1, processor 104 may be configured to generate classifier 140 using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(AB)$ is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Continuing to refer to FIG. 1. In an embodiment, methods and apparatus described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1. In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1. In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, continuing to refer to FIG. 1, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Continuing to refer to FIG. 1, embodiments of apparatus and methods described herein may generate, evaluate, and/ or utilize digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, and with continued reference to FIG. 1, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature. In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Still referring to FIG. 1, embodiments of apparatus and methods described herein may evaluate and utilize secure proofs. As used in this disclosure, a "secure proof" is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Continuing to refer to FIG. 1. Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, with continued reference to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Still referring to FIG. 1. Zero-knowledge proof may include any other suitable zero-knowledge proof. Zero-knowledge proof may include, without limitation bullet-proofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (TOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, still referring to FIG. 1, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Figure 2:
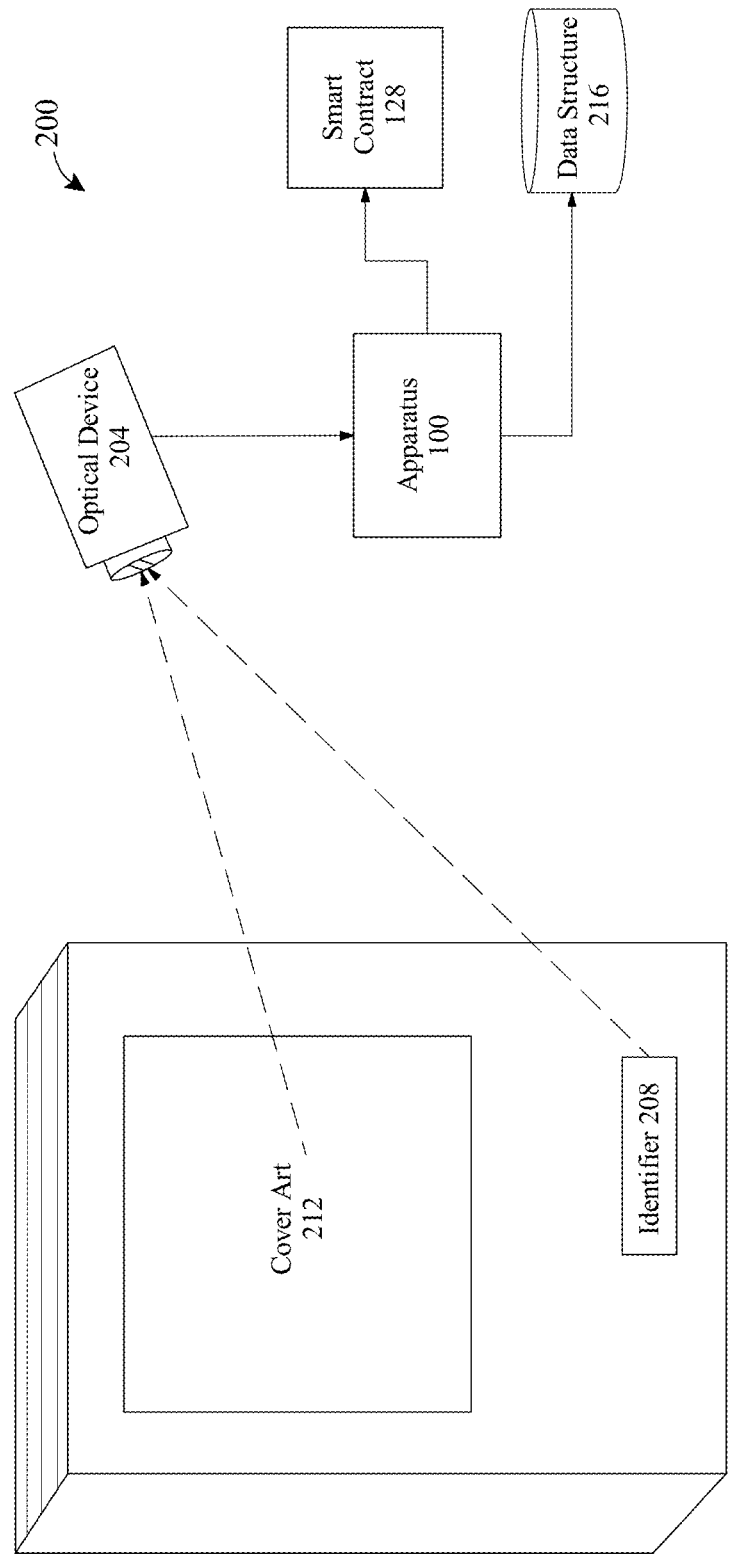
FIG. 2 is a block diagram illustrating an exemplary embodiment of a system for generating a smart contract as a function of scanning a work piece.

Now referring to FIG. 2, an exemplary representation of a system 200 for generating a smart contract as a function of scanning a work piece is illustrated. In some embodiments, apparatus 100 may additionally include at least an optical device 204. As used in this disclosure, an "optical device" is a device that is configured to sense electromagnetic radiation, such as without limitation visible light, and generate an image representing the electromagnetic radiation. In some cases, a camera may include one or more optics. Exemplary non-limiting optics include spherical lenses, aspherical lenses, reflectors, polarizers, filters, windows, aperture stops, and the like. In some cases, at least a camera may include an image sensor. Exemplary non-limiting image sensors include digital image sensors, such as without limitation charge-coupled device (CCD) sensors and complimentary metal-oxide-semiconductor (CMOS) sensors, chemical image sensors, and analog image sensors, such as without limitation film. In some cases, a camera may be sensitive within a non-visible range of electromagnetic radiation, such as without limitation infrared. As used in this disclosure, "image data" is information representing at least a physical scene, space, and/or object. In some cases, image data may be generated by a camera. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image.

Still referring to FIG. 2. Optical device 204 may be further configured to scan an identifier 208 associated with a work piece and convert the identifier 208 into machine-encoded text. Recognition of identifier 208 and conversion into machine-encoded text is described in more detail further below. In a nonlimiting example, optical device 204 may scan identifier 208 attached to work piece and may convert the image of the identifier, such as an ISBN on a book, into a machine-encoded format of identifier 108, which can be used by apparatus 100 to identify the work piece. In another example, identifier 208 may be a handwritten dated signature in a panting, which optical device 208 may scan and convert into a machine-encoded format that has the date and name of the author, which is then used by apparatus 100.

In some embodiments, continuing to refer to FIG. 2, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 2, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 2, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 2, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

Still referring to FIG. 2, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes described with reference to FIGS. 4-6. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 2, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks as taught in reference to FIGS. 5-6.

Still referring to FIG. 2, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Continuing to refer to FIG. 2, optical device 204 may be configured to scan cover art 212 from work piece and covert it into machine-encoded image. "Cover art," as used herein, refers to an illustration that is part of, or attached to, the work piece. An example of cover art 212, without limitation, may be an illustration on the cover of a book. Another example, also without limitation, cover art 212 may be a physical painting. More details on scanning and converting cover art 212 to a machine-encoded image is included further below.

With continued reference to FIG. 2, apparatus 100 may store the machine-encoded cover art 212 in a data structure 216. In an embodiment, data structure 216 may be an InterPlanetary File System (IPFS). "IPFS" as used herein is a peer-to-peer distributed system for storing and accessing files, websites, applications, and data. IPFS may be designed to mitigate vulnerabilities found in central storage systems, such as single point of failure, possible downtimes, and government/corporate censorship. In some embodiments, data structure 216 may be an immutable sequential listing. Immutable sequential listing is discussed in more detail further below. In an embodiment, data structure 216 may include a database located on at least a server. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure 216, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 2, in some embodiments, apparatus 100 may include a machine vision system that includes optical device 204. A machine vision system may use images from optical device 204, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and φ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure. In a nonlimiting example, machine vision system, through optical device 204, may be used to detect cover art 212 of work piece. For example, without limitation, machine vison system may be used to generate a machine-encoded representation of a sculpture. In a further example, also without limitations, machine vision system may be used to generate a machine rendering of the entire sculpture, which may include scanning every angle of the sculpture work piece. In another further example, without limitations, cover art 212 of sculpture work piece may include the machine rendering of the entire sculpture work piece. In an embodiment, machine vision system may include recognizing and extracting identifier 208 from work piece. In a nonlimiting example, machine vision system may recognize a signature in a work piece, such as a painting, and extract the signature as identifier 208.

Continuing to refer to FIG. 2. An exemplary machine vision optical device 204 that may be used by apparatus 100 is an OpenMV Cam H7 from OpenMV, LLC of Atlanta, Georgia, U.S.A. OpenMV Cam comprises a small, low power, microcontroller which allows execution of machine vision applications. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detection motion, for example by way of frame differencing algorithms; marker detection, for example blob detection; object detection, for example face detection; eye tracking; person detection, for example by way of a trained machine learning model; camera motion detection, for example by way of optical flow detection; code (barcode) detection and decoding; image capture; and video recording.

Continuing to refer to FIG. 2, apparatus 100 may be configured to include, in smart contract 128, a reference to the cover art 212 location in the data structure 216, where the cover art 212 is associated with the identifier 208. In an embodiment, a plurality of content may be associated with identifier 208, where the plurality of content is stored in data structure 216 by apparatus 100. In a further embodiment, smart contract may include the identifier 208 and the location in the data structure 216 of the plurality of content associated with the identifier 208. In a nonlimiting example, apparatus 100, through optical device 204, may scan a book's identifier 208, such as the ISBN, and include in the smart contract the location in data structure 216 of the book's content. Persons having ordinary skill in the art will, after having reviewed the entirety of this disclosure, recognize that contents in data structure 216 included as reference in smart contract may only be accessed by someone with possession of creative work token 120 associated with creative work datum 112, since smart contract 128 is stored in an immutable sequential listing.

Figure 3:
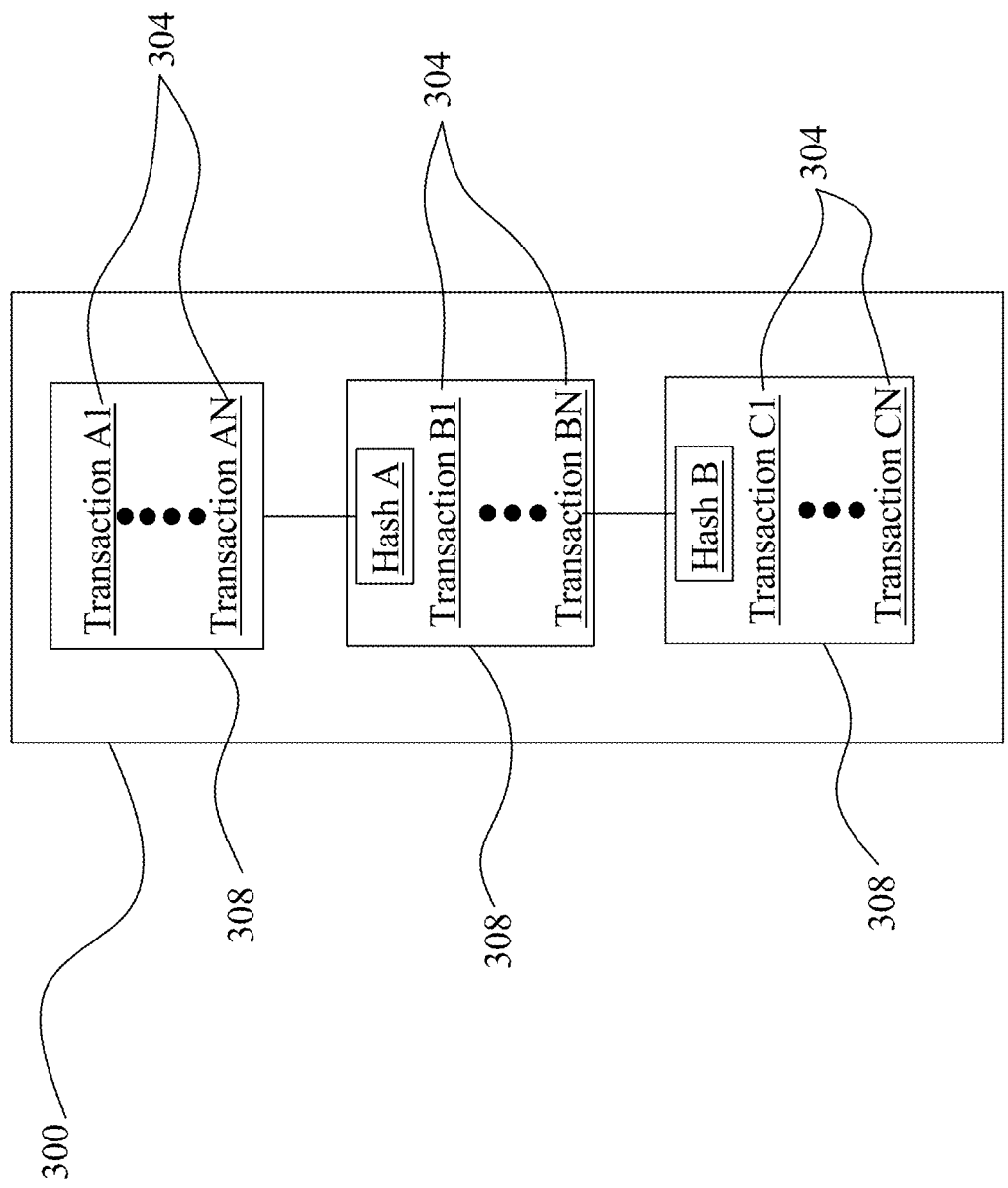
FIG. 3 is a block diagram illustrating an exemplary embodiment of an immutable sequential listing.

Now referring to FIG. 3, an exemplary embodiment of an immutable sequential listing 300 is illustrated. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

Referring now to FIG. 3, an exemplary embodiment of an immutable sequential listing 300 is illustrated. Data elements are listing in immutable sequential listing 300; data elements may include any form of data, including textual data, image data, encrypted data, cryptographically hashed data, and the like. Data elements may include, without limitation, one or more at least a digitally signed assertion. In one embodiment, a digitally signed assertion 304 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 304. In an embodiment, collection of textual data states that the owner of a certain transferable item represented in a digitally signed assertion 304 register is transferring that item to the owner of an address. A digitally signed assertion 304 may be signed by a digital signature created using the private key associated with the owner's public key, as described above.

Still referring to FIG. 3, a digitally signed assertion 304 may describe a transfer of virtual currency, such as cryptocurrency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 304 may describe the transfer of a physical good; for instance, a digitally signed assertion 304 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 304 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

Still referring to FIG. 3, in one embodiment, an address is a textual datum identifying the recipient of virtual currency or another item of value in a digitally signed assertion 304. In some embodiments, address is linked to a public key, the corresponding private key of which is owned by the recipient of a digitally signed assertion 304. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 304 may record a subsequent a digitally signed assertion 304 transferring some or all of the value transferred in the first a digitally signed assertion 304 to a new address in the same manner. A digitally signed assertion 304 may contain textual information that is not a transfer of some item of value in addition to, or as an alternative to, such a transfer. For instance, as described in further detail below, a digitally signed assertion 304 may indicate a confidence level associated with a distributed storage node as described in further detail below.

In an embodiment, and still referring to FIG. 3 immutable sequential listing 300 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 300 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

Still referring to FIG. 3, immutable sequential listing 300 may preserve the order in which the at least a posted content took place by listing them in chronological order; alternatively or additionally, immutable sequential listing 300 may organize digitally signed assertions 304 into sub-listings 308 such as "blocks" in a blockchain, which may be themselves collected in a temporally sequential order; digitally signed assertions 304 within a sub-listing 308 may or may not be temporally sequential. The ledger may preserve the order in which at least a posted content took place by listing them in sub-listings 308 and placing the sub-listings 308 in chronological order. The immutable sequential listing 300 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 300 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 3, immutable sequential listing 300, once formed, may be inalterable by any party, no matter what access rights that party possesses. For instance, immutable sequential listing 300 may include a hash chain, in which data is added during a successive hashing process to ensure non-repudiation. Immutable sequential listing 300 may include a block chain. In one embodiment, a block chain is immutable sequential listing 300 that records one or more new at least a posted content in a data item known as a sub-listing 308 or "block." An example of a block chain is the BITCOIN block chain used to record BITCOIN transactions and values. Sub-listings 308 may be created in a way that places the sub-listings 308 in chronological order and link each sub-listing 308 to a previous sub-listing 308 in the chronological order so that any computing device may traverse the sub-listings 308 in reverse chronological order to verify any at least a posted content listed in the block chain. Each new sub-listing 308 may be required to contain a cryptographic hash describing the previous sub-listing 308. In some embodiments, the block chain contains a single first sub-listing 308 sometimes known as a "genesis block."

Still referring to FIG. 3, the creation of a new sub-listing 308 may be computationally expensive; for instance, the creation of a new sub-listing 308 may be designed by a "proof of work" protocol accepted by all participants in forming the immutable sequential listing 300 to take a powerful set of computing devices a certain period of time to produce. Where one sub-listing 308 takes less time for a given set of computing devices to produce the sub-listing 308 protocol may adjust the algorithm to produce the next sub-listing 308 so that it will require more steps; where one sub-listing 308 takes more time for a given set of computing devices to produce the sub-listing 308 protocol may adjust the algorithm to produce the next sub-listing 308 so that it will require fewer steps. As an example, protocol may require a new sub-listing 308 to contain a cryptographic hash describing its contents; the cryptographic hash may be required to satisfy a mathematical condition, achieved by having the sub-listing 308 contain a number, called a nonce, whose value is determined after the fact by the discovery of the hash that satisfies the mathematical condition. Continuing the example, the protocol may be able to adjust the mathematical condition so that the discovery of the hash describing a sub-listing 308 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 308 according to the protocol is known as "mining." The creation of a new sub-listing 308 may be designed by a "proof of stake" protocol as will be apparent to those skilled in the art upon reviewing the entirety of this disclosure.

Continuing to refer to FIG. 3, in some embodiments, protocol also creates an incentive to mine new sub-listings 308. The incentive may be financial; for instance, successfully mining a new sub-listing 308 may result in the person or entity that mines the sub-listing 308 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 308. Each sub-listing 308 created in immutable sequential listing 300 may contain a record or at least a posted content describing one or more addresses that receive an incentive, such as virtual currency, as the result of successfully mining the sub-listing 308.

With continued reference to FIG. 3, where two entities simultaneously create new sub-listings 308, immutable sequential listing 300 may develop a fork; protocol may determine which of the two alternate branches in the fork is the valid new portion of the immutable sequential listing 300 by evaluating, after a certain amount of time has passed, which branch is longer. "Length" may be measured according to the number of sub-listings 308 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 308 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 300 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 300.

Still referring to FIG. 3, additional data linked to at least a posted content may be incorporated in sub-listings 308 in the immutable sequential listing 300; for instance, data may be incorporated in one or more fields recognized by block chain protocols that permit a person or computer forming a at least a posted content to insert additional data in the immutable sequential listing 300. In some embodiments, additional data is incorporated in an unspendable at least a posted content field. For instance, the data may be incorporated in an OP RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 3, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 308 in a block chain computationally challenging; the incentive for producing sub-listings 308 may include the grant of new crypto-currency to the miners. Quantities of crypto-currency may be exchanged using at least a posted content as described above.

Figure 4:
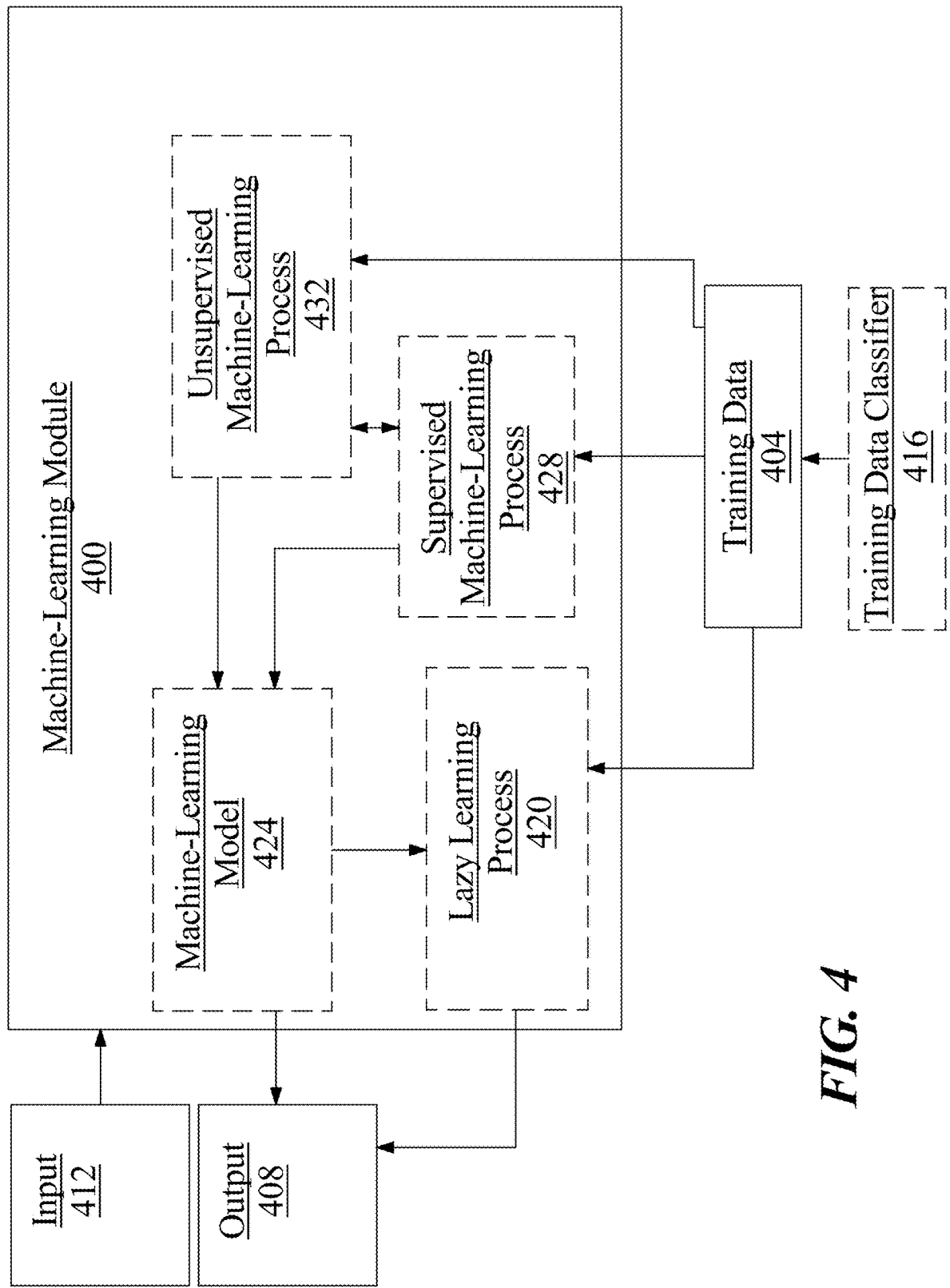
FIG. 4 is a block diagram of an exemplary embodiment of a machine learning processes.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example inputs may include identifiers associated with work pieces and outputs may include at least a creative work class 116.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure, and as described in FIG. 1, is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. Classifier 140 may be configured to output at least a datum that labels or otherwise identifies a set of data that are clustered together, found to be close under a distance metric as described below, or the like. Machine-learning module 400 may generate classifier 140 using a classification algorithm, defined as a processes whereby a computing device and/or any module and/or component operating thereon derives classifier 140 from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data according to creative work class 116 type based on class set by author, class set as a function of the relation of creative work datum 112 to other creative works in a collection, number of scans received associated with creative work datum 112, and the like.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include creative work data as described above as inputs, creative work classes as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 5:
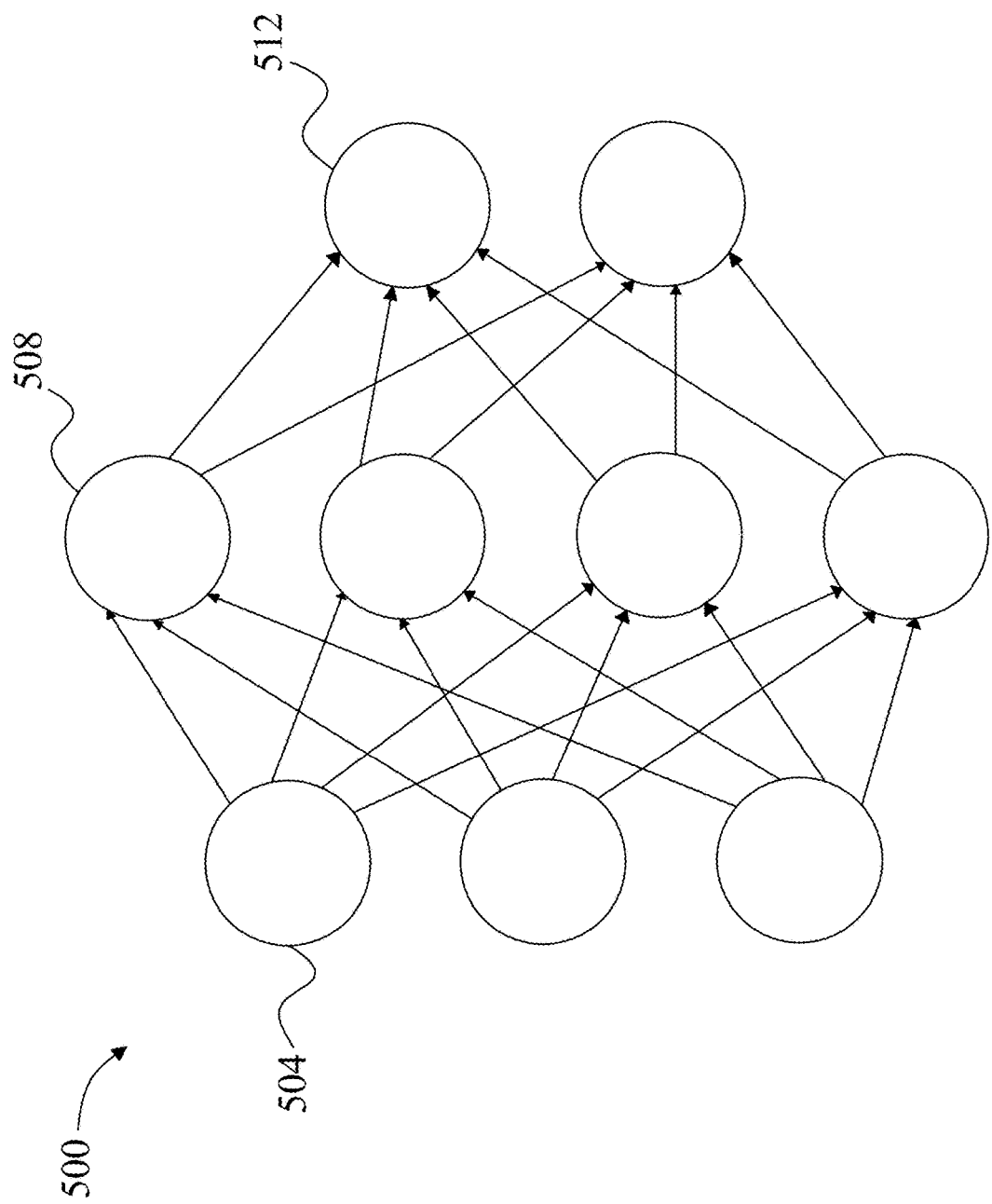
FIG. 5 is a diagram of an exemplary embodiment of a neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training data set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
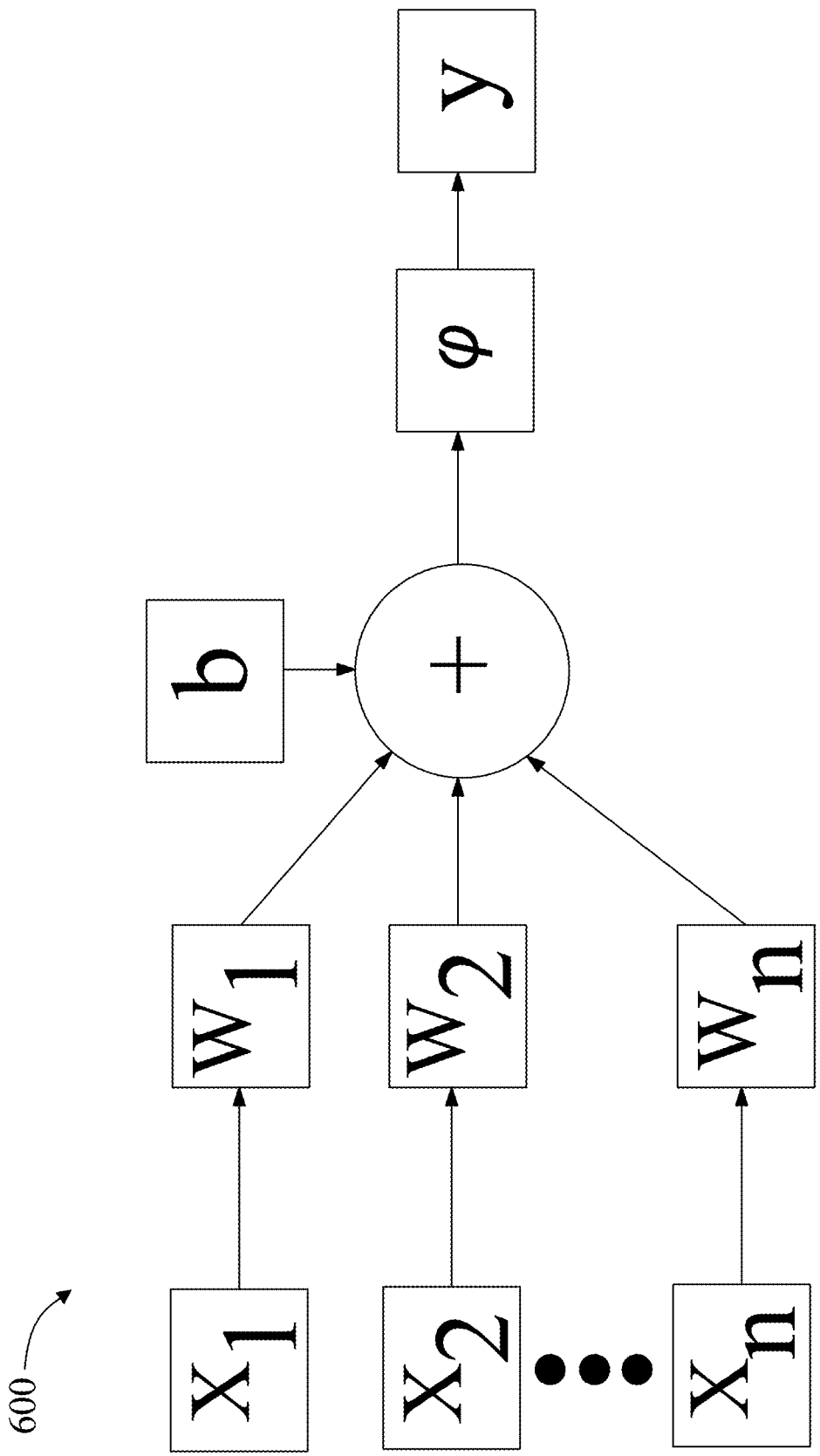
FIG. 6 is a diagram of an illustrative embodiment of a node of a neural network.

Referring now to FIG. 6, an exemplary embodiment of a node of a neural network is illustrated. A node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function co, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7:
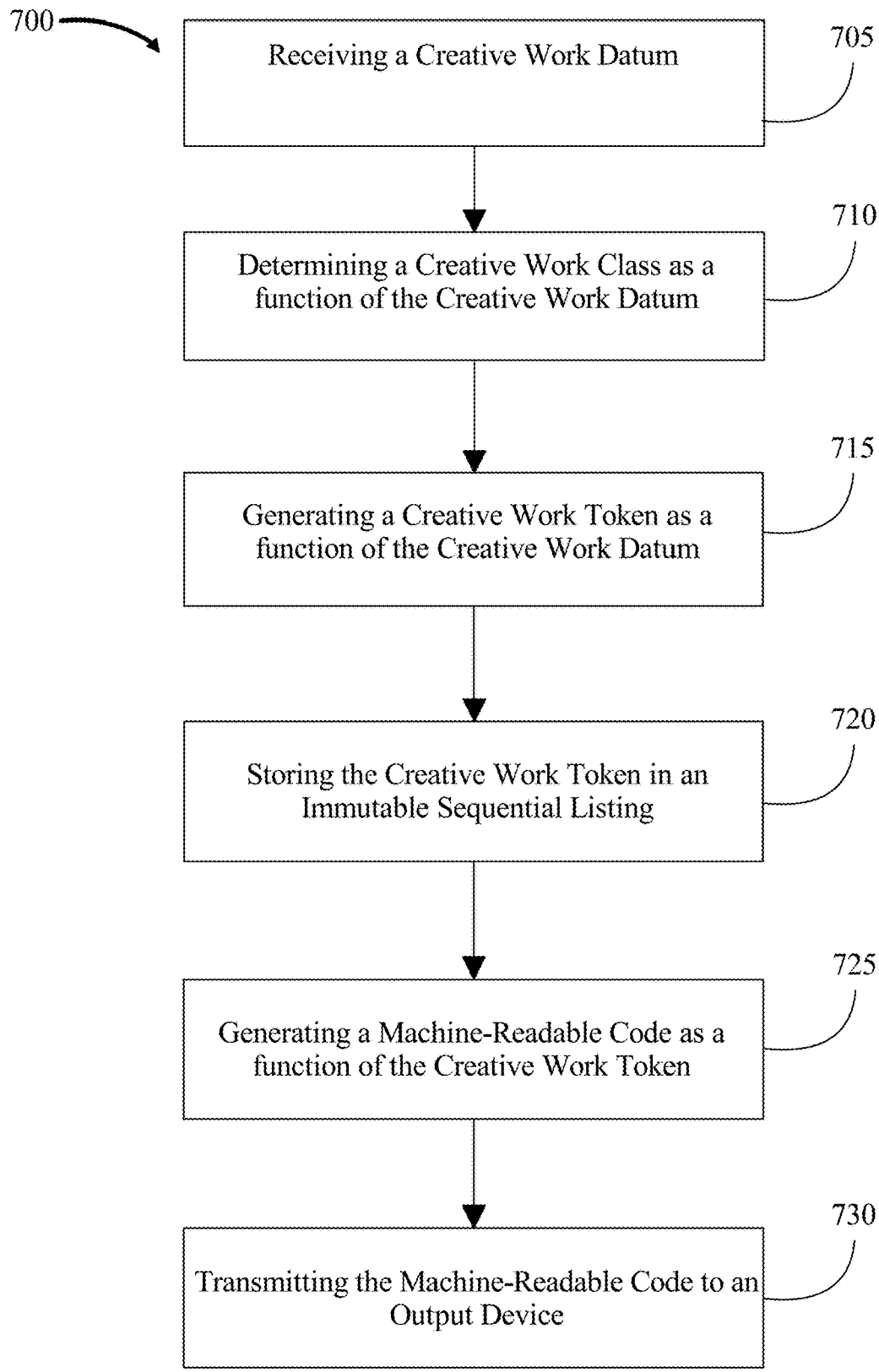
FIG. 7 is an illustrative flow diagram of an exemplary method for scannable non-fungible token generation.

Now referring to FIG. 7, a method scannable non-fungible token generation is presented. At step 705, method 700 includes receiving a creative work datum 112. In an embodiment, receiving the creative work datum 112 may include scanning a work piece using optical device 204 communicatively connected to processor 104, described in more detail in FIG. 2 above. This step may be implemented as disclosed with reference to FIGS. 1-6.

Continuing to refer to FIG. 7, at step 710, method 700 includes determining a creative work class 116 as a function of the creative work datum 112. In a nonlimiting example, creative work datum 112 may include no restrictions as to resale, which processor 104 may determine that creative work class 116 is of "owner," which allows for resale without limitations. This may be implemented as disclosed with reference to FIGS. 1-6.

With continued reference to FIG. 7, at step 715, method 700 includes generating a creative work token 120. In a nonlimiting example, creative work token 120 may be generated by a blockchain platform prior to storing data associated with work piece in the blockchain. Generating the creative work token 120 may be implemented as disclosed with reference to FIGS. 1-6.

Still referring to FIG. 7, method 700, at step 720, includes storing the creative work token 120 in an immutable sequential listing 124, wherein storing the creative work token 120 comprises generating a smart contract 128 associated with the creative work datum 112, the smart contract 128 including the creative work class 116. In a nonlimiting example, processor 104 may store the creative work token 120 in the immutable sequential listing 124 and generate a smart contract 128 specifying the location of the work piece and royalties to be paid to author on resale, if the work piece includes an "author" class. In an embodiment, method 700 may include storing creative work datum 112 in the immutable sequential listing 124. This step may be implemented as disclosed with reference to FIGS. 1-6.

Continuing to refer to FIG. 7, at step 725, method 700 includes generating a machine-readable code 132 as a function of the creative work token 120. In an embodiment, machine-readable code is a quick response (QR) code. In a further embodiment, machine-readable code is a password protected QR code. In another embodiment, machine-readable code is a near-field communication (NFC) tag. In some embodiments, machine-readable code 132 further includes an advertisement datum. Step 725 may be implemented as disclosed with reference to FIGS. 1-6.

Still referring to FIG. 7, method 700, at step 730, includes transmitting the machine-readable code 132 to an output device 136. In a nonlimiting example, method may include transmitting the Machine-readable code to a wireless printer, which may be used to print physical representations of the machine-readable code 132. This step may be implemented as disclosed with reference to FIGS. 1-6.

Continuing to refer to FIG. 7. In an embodiment, method 700 may further include monitoring, by the processor, the number of times the machine-readable code has been scanned. In a further embodiment, method 700 may include re-classifying, by the processor, creative work class 116 as a function of the number of scans. In a further embodiment, re-classifying creative work class 116 includes using a classifier. Classifier 140 is described in detail further above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
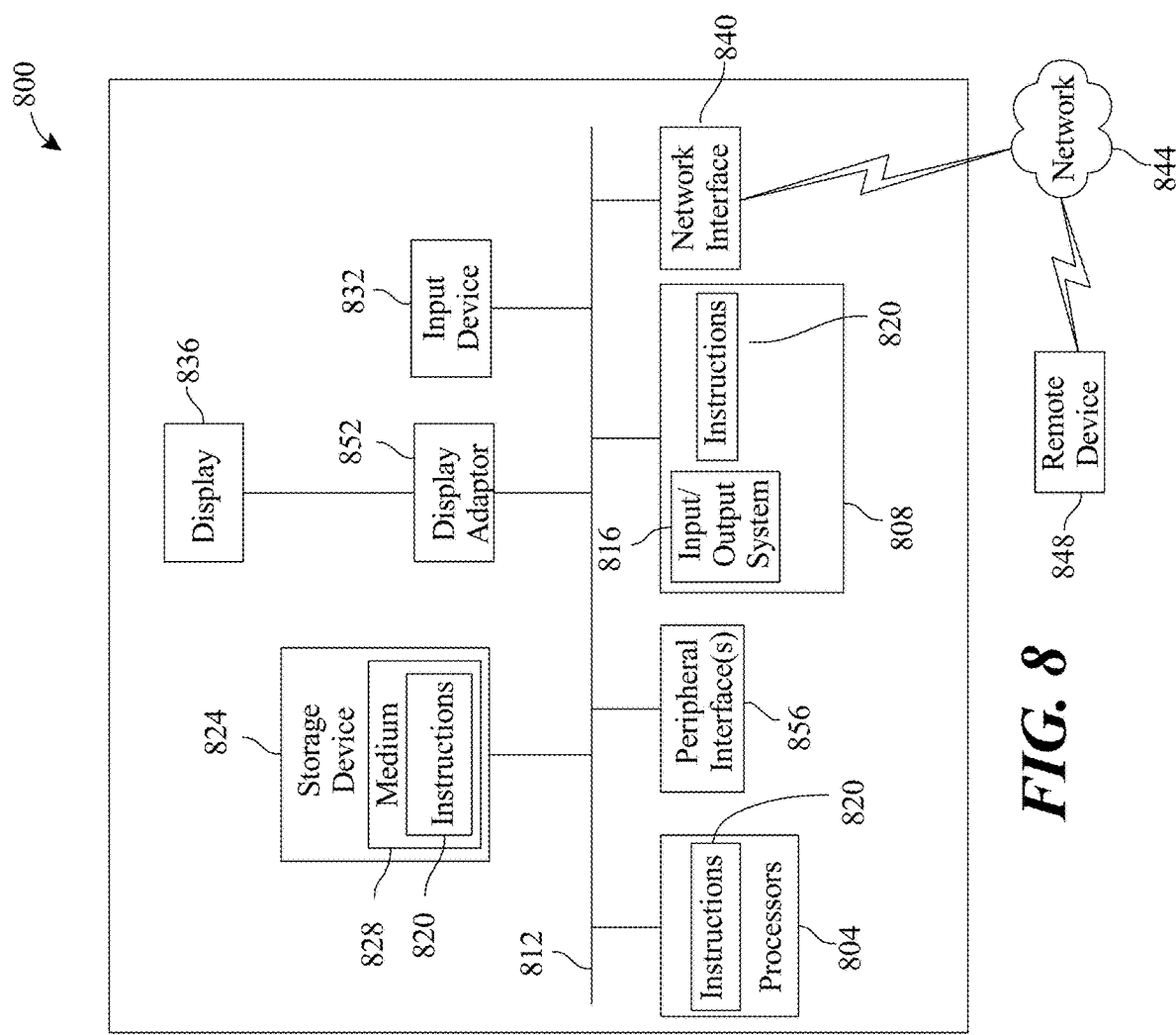
FIG. 8 is a block diagram of an exemplary computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIREWIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for scannable non-fungible token generation, the apparatus comprising:
    at least a processor; and
    a memory communicatively connected to the at least a processor, the memory containing instructions that causes the at least a processor to:
    receive a creative work datum;
    determine a creative work class as a function of the creative work datum, wherein the creative work class comprises an ownership type associated with the creative work datum, wherein the creative work class further comprises a collector class, an author class, an owner class, a creator class, an investor class, and a copyright class;
    generate a creative work token as a function of the creative work datum;
    store the creative work token in an immutable sequential listing, wherein storing the creative work token comprises generating a smart contract associated with the creative work datum, the smart contract comprising the creative work class;
    generate a machine-readable code as a function of the creative work token and the creative work class;
    transmit the machine-readable code to an output device;
    track a number of times the machine-readable code is scanned; and
    reclassify the creative work class as a function of the number of times the machine-readable code is scanned; a plurality of scan thresholds comprising a scan threshold for each of the collector class, the author class, the owner class, the creator class, the investor class, and the copyright class; and an associated specified measurement of time for the plurality of scan thresholds, wherein reclassifying the creative work class comprises:
    setting the plurality of scan thresholds, wherein setting the plurality of scan thresholds comprises:
    identifying a second work piece by comparing identifying work piece data in the creative work datum to work piece data for the second work piece; and
    setting each of the plurality of scan thresholds based on the work piece data for the second work piece.

2. The apparatus of claim 1, wherein the machine-readable code comprises a quick response (QR) code.

3. The apparatus of claim 2, wherein the machine-readable code comprises a password protected QR code.

4. The apparatus of claim 1, wherein the machine-readable code comprises a near-field communication (NFC) tag.

5. The apparatus of claim 1, wherein the machine-readable code comprises an advertisement datum.

6. The apparatus of claim 1, wherein the memory contains instructions further configuring the at least a processor to monitor a number of scans, wherein the number of scans is the number of times that the machine-readable code has been scanned.

7. The apparatus of claim 1, wherein re-classifying the creative work class comprises using a classifier.

8. The apparatus of claim 1, wherein receiving the creative work datum further comprises scanning a work piece using an optical device communicatively connected to the at least a processor.

9. A method for scannable non-fungible token generation, the method comprising:
    receiving, by a processor, a creative work datum;
    determining, by the processor, a creative work class as a function of the creative work datum, wherein the creative work class comprises an ownership type associated with the creative work datum, wherein the creative work class further comprises a collector class, an author class, an owner class, a creator class, an investor class, and a copyright class;
    generating, by the processor, a creative work token as a function of the creative work datum;
    storing, by the processor, the creative work token in an immutable sequential listing, wherein storing the creative work token comprises generating a smart contract associated with the creative work datum, the smart contract comprising the creative work class;
    generating, by the processor, a machine-readable code as a function of the creative work token and the creative work class;
    transmitting, by the processor, the machine-readable code to an output device;
    tracking, by the processor, a number of times the machine-readable code is scanned; and
    reclassifying, by the processor, the creative work class as a function of the number of times the machine-readable code is scanned; a plurality of scan thresholds comprising a scan threshold for each of the collector class, the author class, the owner class, the creator class, the investor class, and the copyright class; and an associated specified measurement of time for the plurality of scan thresholds, wherein reclassifying the creative work class comprises:
    setting the plurality of scan thresholds, wherein setting the plurality of scan thresholds comprises:
    identifying a second work piece by comparing identifying work piece data in the creative work datum to work piece data for the second work piece; and
    setting each of the plurality of scan thresholds based on the work piece data for the second work piece.

10. The method of claim 9, wherein the machine-readable code comprises a quick response (QR) code.

11. The method of claim 10, wherein the machine-readable code comprises a password protected QR code.

12. The method of claim 9, wherein the machine-readable code comprises a near-field communication (NFC) tag.

13. The method of claim 9, wherein the machine-readable code further comprises an advertisement datum.

14. The method of claim 9, wherein the method further comprises monitoring, by the processor, the number of times the machine-readable code has been scanned.

15. The method of claim 9, wherein re-classifying the creative work class comprises using a classifier.

16. The method of claim 9, wherein receiving the creative work datum further comprises scanning a work piece using an optical device communicatively connected to the at least a processor.

* * * * *